United States Patent
Koo et al.

(10) Patent No.: US 8,542,101 B2
(45) Date of Patent: Sep. 24, 2013

(54) DATA RECOVERY METHOD AND APPARATUS FOR RADIO FREQUENCY IDENTIFICATION

(75) Inventors: Ji-hun Koo, Yongin-si (KR); Woo-shik Kang, Suwon-si (KR); Kyung-ho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1331 days.

(21) Appl. No.: 11/585,982

(22) Filed: Oct. 25, 2006

(65) Prior Publication Data

US 2008/0001719 A1 Jan. 3, 2008

(30) Foreign Application Priority Data

Jun. 29, 2006 (KR) .................. 10-2006-0059087

(51) Int. Cl.
*G06K 7/08* (2006.01)
(52) U.S. Cl.
USPC ..................................... 340/10.2; 340/13.26
(58) Field of Classification Search
USPC .............. 340/10.1, 10.2, 10.4, 825.58, 825.7, 340/825.71, 825, 825.73, 13.26; 375/329
See application file for complete search history.

(56) References Cited

U.S. PATENT DOCUMENTS

| | | | | |
|---|---|---|---|---|
| 5,649,295 A * | 7/1997 | Shober et al. | ................ | 340/10.1 |
| 5,777,561 A * | 7/1998 | Chieu et al. | ................ | 340/10.32 |
| 5,952,922 A * | 9/1999 | Shober | ................ | 340/572.4 |
| 6,064,296 A * | 5/2000 | Clancy et al. | ................ | 340/10.1 |
| 6,088,402 A * | 7/2000 | White | ................ | 375/326 |
| 6,122,329 A * | 9/2000 | Zai et al. | ................ | 375/329 |
| 6,192,222 B1 * | 2/2001 | Greeff et al. | ................ | 455/106 |
| 6,353,406 B1 * | 3/2002 | Lanzl et al. | ................ | 342/118 |
| 6,356,230 B1 * | 3/2002 | Greef et al. | ................ | 342/127 |
| 6,433,671 B1 * | 8/2002 | Nysen | ................ | 340/10.41 |
| 6,501,807 B1 * | 12/2002 | Chieu et al. | ................ | 375/329 |
| 6,531,957 B1 * | 3/2003 | Nysen | ................ | 340/10.1 |
| 6,570,938 B1 * | 5/2003 | Boccuzzi et al. | ................ | 375/340 |
| 6,600,905 B2 * | 7/2003 | Greeff et al. | ................ | 455/106 |
| 6,611,224 B1 * | 8/2003 | Nysen et al. | ................ | 342/42 |
| 6,661,335 B1 * | 12/2003 | Seal | ................ | 340/10.1 |
| 6,686,830 B1 * | 2/2004 | Schirtzer | ................ | 340/10.2 |
| 6,861,886 B1 * | 3/2005 | Ludden et al. | ................ | 327/156 |
| 7,428,273 B2 * | 9/2008 | Foster | ................ | 375/329 |
| 7,486,131 B2 * | 2/2009 | Murofushi et al. | ................ | 329/304 |
| 7,619,466 B2 * | 11/2009 | Oishi et al. | ................ | 329/304 |
| 8,218,688 B2 * | 7/2012 | Murofushi et al. | ................ | 375/324 |
| 2002/0063622 A1 * | 5/2002 | Armstrong et al. | ................ | 340/10.31 |
| 2004/0196926 A1 * | 10/2004 | Chien et al. | ................ | 375/316 |

* cited by examiner

*Primary Examiner* — Jennifer Mehmood
*Assistant Examiner* — Rufus Point
(74) *Attorney, Agent, or Firm* — Sughrue Mion, PLLC

(57) ABSTRACT

Provided are an RFID reader and a data recovery method which selectively selects only an integrity-checked phase signal, when receiving a backscattered signal of an RFID tag through an I signal path or a Q signal path, and may reduce a shadow area of a read range. The RFID reader includes a signal receiver which receives a plurality of phase signals; a symbol detector which recovers data with respect to each of the received phase signals; and a signal selector which selects a signal that satisfies a predetermined standard, from the data-recovered phase signals.

13 Claims, 5 Drawing Sheets

DATA RECOVERY METHOD AND APPARATUS FOR RADIO FREQUENCY IDENTIFICATION

CROSS-REFERENCE TO RELATED APPLICATION

This application claims priority from Korean Patent Application No. 10-2006-0059087, filed on Jun. 29, 2006, in the Korean Intellectual Property Office, the disclosure of which is incorporated herein by reference.

BACKGROUND OF THE INVENTION

1. Field of the Invention

Apparatuses and methods consistent with the present invention relate to a radio frequency identification (RFID) reader and a data recovery method which selectively selects only an integrity-checked phase signal, when receiving a backscattered signal of an RFID tag via an in-phase (I) signal path or a quadrature-phase (Q) signal path, and may reduce a shadow area of a read range.

2. Description of the Related Art

When a radio frequency identification (RFID) reader receives a backscattered signal of an RFID tag in a general RFID system, a phase delay occurs according to a distance between the RFID reader and the RFID tag. When a receiver of the RFID reader is demodulated by using a quadrate mixer, the backscattered signal of the RFID tag is received via an I signal path or a Q signal path due to the phase delay.

The received signal is recovered as original data in a predetermined recovery device. Also, through the recovery operations described above, information included in the RFID tag may be read by the RFID reader.

As an example of a conventional data recovery method, a system of recovering a radio frequency (RF) signal which is received via an I channel and a Q channel is disclosed in U.S. Pat. No. 6,122,329 (hereinafter, patent '329) entitled 'Radio frequency identification interrogator signal processing system for reading moving transponders'.

The patent '329 discloses a data recovery method in which an I signal and a Q signal are received, a phase angle between the I signal and the Q signal is estimated, and data is recovered by combining the I signal and the Q signal.

However, in this data recovery method, an RFID reader may not recover a phase of the I signal or the Q signal, when performing a direct current (DC)-cancellation by using a high-pass filter (HPF) in a receiver of an RFID interrogator, i.e. an RFID reader.

Specifically, the RFID reader which is embodied in the patent '329 may not distinguish an X radian and an X+π radian. In the following equations, a difference between a recovered signal and a signal prior to being transmitted is shown.

$$I(t) \cong A \cdot \left(|m(t)\cos\varphi| - \left|\frac{\cos\varphi}{2}\right|\right)$$

$$Q(t) \cong A \cdot \left(|m(t)\sin\varphi| - \left|\frac{\sin\varphi}{2}\right|\right).$$

$$\sqrt{I^2(t) + Q^2(t)} \neq m(t),$$

where m(t) designates a normalized ideal Rx signal, and the $\varphi$ designates a phase of m(t).

In this instance, as shown above, the recovered signal and the signal prior to be transmitted may be different.

As another example of a conventional data recovery method, a method of deriving data bits in order to recover a tag signal is disclosed in U.S. Pat. No. 6,501,807 (hereinafter, patent '807) entitled 'Data recovery system for radio frequency identification interrogator'.

In the patent '807, a tag signal is received, an over-sampling is performed, relative polarities are compared, and data bits are derived.

However, this data recovery method may cause a partial shadow area of a read range, when selecting any one of the I signal and the Q signal based on a relative size of the I signal and the Q signal.

Specifically, in the conventional method disclosed in the patent '807, when magnitudes of the I signal and the Q signal are similar, and signs of cos $\varphi$ and sin $\varphi$ are opposite, there appears a shadow area in which a tag signal may not be read at a distance of 3π/4 and a distance of 7π/4.

Accordingly, a new data recovery model which enables a reliable recovery of tag information which is transmitted from an RFID tag and significant reduction of a shadow area in a read range is highly required.

SUMMARY OF THE INVENTION

An aspect of the present invention provides an RFID reader and a data recovery method which may selectively select a data-recovered and an integrity-checked phase signal of each of an I signal path and a Q signal path, and reduce a shadow area of a read range through signal processing by using a completely recovered data signal.

Another aspect of the present invention also provides an RFID reader and data recovery method which may accurately select a data-recovered phase signal through an integrity check, and notably reduce a shadow area, even when a backscattered signal of an RFID tag is received via an I signal path or a Q signal path.

According to still another aspect of the present invention, there is provided an RFID reader including: a signal receiver which receives a plurality of phase signals; a symbol detector which recovers data with respect to each of the received phase signals; and a signal selector which selects a signal that satisfies a predetermined standard, from the data-recovered phase signals.

According to still another aspect of the present invention, there is provided a data recovery method including: receiving a plurality of phase signals; recovering data with respect to each of the received phase signals; and selecting a signal which satisfies a predetermined standard, from the data-recovered phase signals.

BRIEF DESCRIPTION OF THE DRAWINGS

The above and/or other aspects of exemplary embodiments of the present invention will become apparent and more readily appreciated from the following detailed description, taken in conjunction with the accompanying drawings, in which.

DETAILED DESCRIPTION OF EXEMPLARY EMBODIMENTS

Figure 1:
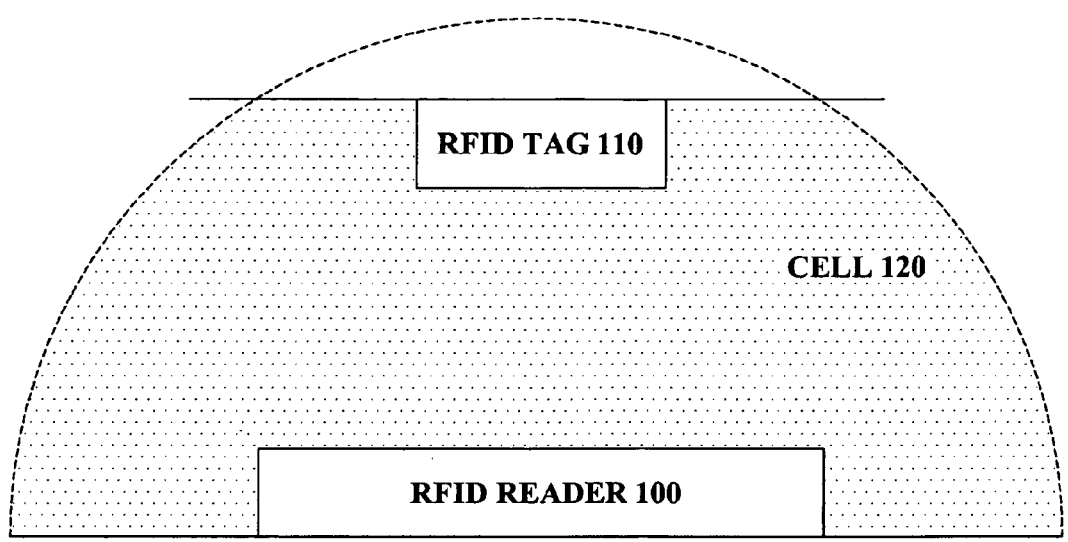
FIG. 1 is a diagram illustrating an RFID tag and an RFID reader according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the drawings.

In this specification, an RFID may indicate a noncontact or radio frequency identification technology, which reads tag information by attaching an RFID tag to an object and using wireless communication technologies. The RFID functions as a sensor of a network in a ubiquitous environment, and may be used for identifying the object by using a predetermined radio frequency (RF).

As an example, the RFID technology designates a network address for each object, and gives an identification code which may be managed by a computer. Accordingly, a computer may identify all objects around the computer, and build a network among the objects.

Particularly, in the present specification, a following exemplary data recovery method is proposed. In the data recovery method according to an exemplary embodiment of the present invention, an RFID reader receives a backscattered signal of an RFID tag, selectively selects a phase signal which is determined to be completely recovered by an integrity check, and thereby may optimally reduce a shadow area of a read range.

FIG. 1 is a diagram illustrating an RFID tag and an RFID reader according to an exemplary embodiment of the present invention.

In an RFID network environment, the RFID reader 100 designates a predetermined read range as a cell 120, and identifies an object which enters into the cell 120. Specifically, the RFID reader 100 emits a predetermined command signal in the cell 120, and receives a response signal which is emitted in response to the command signal from the RFID tag 110. In this instance, the RFID tag 110 is attached to the object. Accordingly, the RFID reader 100 identifies the object that enters into the cell 120.

The response signal includes tag information in a radio frequency (RF) band. The tag information which is received in the RFID reader 100 passes through an RF modem and is protocol-processed in a protocol controller.

The RFID reader 100 modifies a random distortion which occurs while the tag information passes through the cell 120, specifically, the random distortion which occurs between the RFID reader 100 and the RFID tag 110. Accordingly, the RFID reader 100 recovers original tag information.

Particularly, when receiving the backscattered signal of the RFID tag 110 via an I signal path or a Q signal path, the RFID reader 100 may independently recover data of each of the I signal path and the Q signal path, and check an integrity of the recovered data.

Figure 2:
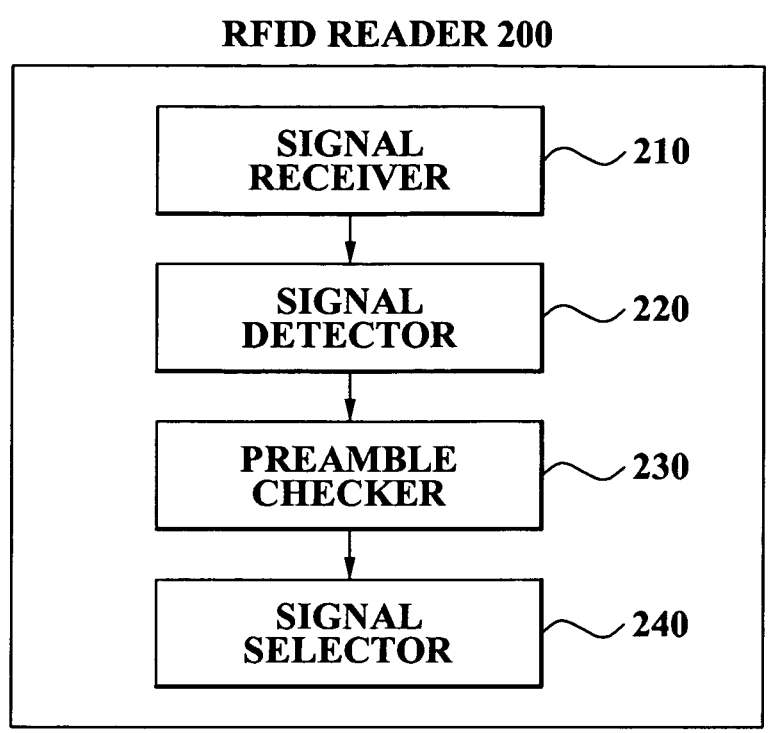
FIG. 2 is a diagram illustrating a configuration of an RFID reader according to an exemplary embodiment of the present invention.

FIG. 2 is a diagram illustrating a configuration of an RFID reader according to an exemplary embodiment of the present invention.

According to an exemplary embodiment of the present invention, the RFID reader 200 includes a signal receiver 210, a signal detector 220, a preamble checker 230, and a signal selector 240.

The signal receiver 210 receives a plurality of phase signals. Specifically, the signal receiver 210 receives tag information from an RFID tag 110 of an object which enters into a cell 120. Also, the signal receiver 210 receives the phase signals of each signal path from the received tag information. The RFID tag 110 may include a passive RFID tag, which is a read-only tag, and an active RFID tag, which is a read/write tag.

The phase signals may be an I phase signal or a Q phase signal having a predetermined phase difference from the I phase signal. Accordingly, the signal receiver 210 receives the I phase signal via the I signal path, and the Q phase signal via the Q signal path.

For this, the signal receiver 210 may include a down mixer, a DC compensator, an analog Rx-filter, and an analog-to-digital converter (ADC). In this instance, the down mixer removes a carrier frequency from the received signal, and converts the carrier frequency to a baseband signal. The DC compensator removes a DC component of the baseband signal. The analog Rx-filter derives a major component of a signal. The ADC converts an analog signal to a digital signal.

The signal detector 220 recovers data from each of the received phase signals. Specifically, the signal detector 220 functions as a decoder by recovering a symbol from each of the phase signals of the transmitted tag information. In this instance, the symbol includes practical information. Also, the signal detector 220 tracks the symbol from the I phase signal and the Q phase signal with respect to the I signal path and the Q signal path, and recovers the tracked symbol by using a predetermined pattern matching method.

The preamble checker 230 checks an integrity of the recovered data. Specifically, the preamble checker 230 detects a preamble signal from the recovered symbol. In this instance, the integrity check of the recovered data is a process of determining whether original data of the tag information which is stored in the RFID tag 110 and the data which is recovered in the RFID reader 100 are identical.

For example, the preamble checker 230 compares the data which is recovered in the signal detector 220 and data of the tag information which is previously included. As a result of the comparison, the preamble checker 230 determines that there is no error with respect to the data including the preamble signal.

The signal selector 240 selects the phase signal which satisfies a predetermined standard. Specifically, the signal selector 240 selects only an integrity-checked phase signal from the data recovered from the I phase signal or the data recovered from the Q phase signal. Also, the signal selector 240 enables a subsequent operation of the selected phase signal.

Thus, according to an exemplary embodiment of the present invention, it is possible to embody an RFID reader and a data recovery method which may selectively select a data-recovered and an integrity-checked phase signal of each of an I signal path and a Q signal path, and reduce a shadow area of a read range through a signal processing by using a completely recovered data signal.

Figure 3:
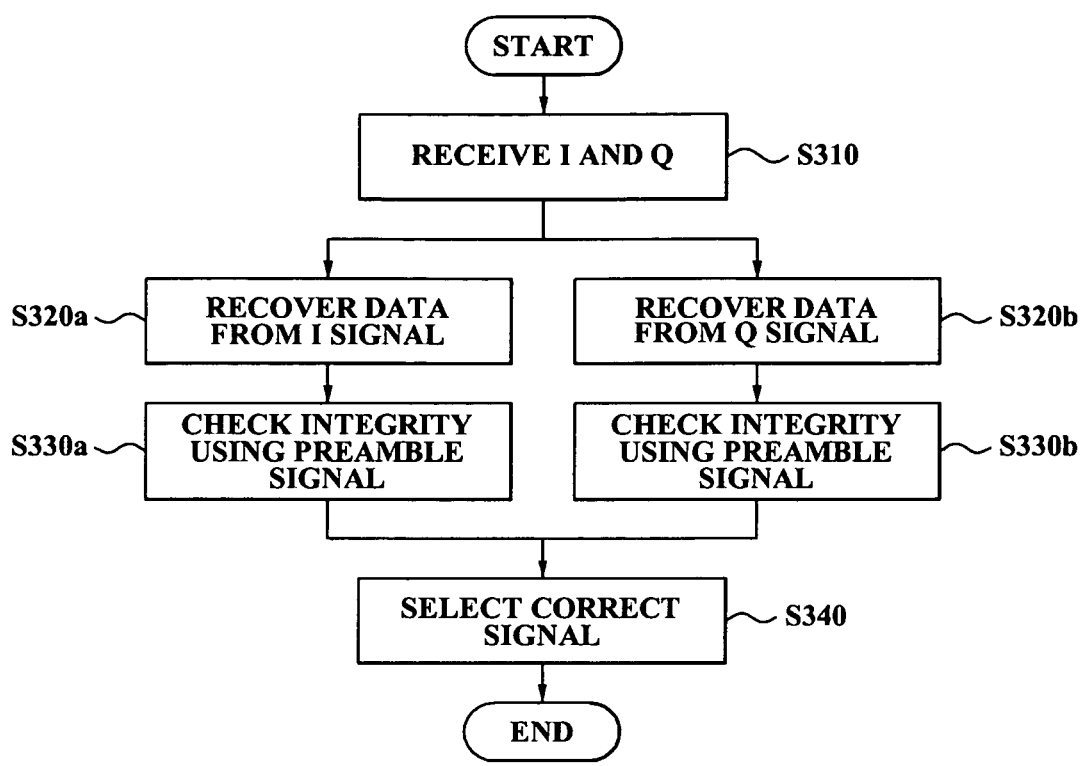
FIG. 3 is a diagram illustrating an operation principle of an RFID reader according to an exemplary embodiment of the present invention.

FIG. 3 is a diagram illustrating an operation of an RFID reader according to an exemplary embodiment of the present invention.

In operation S310, the RFID reader 200 receives an I phase signal and a Q phase signal. Specifically, when an object with an attached RFID tag 110 enters into a range of a predetermined cell 120, the RFID reader 200 receives tag information from the RFID tag 110, and receives the I phase signal of the received tag information from an I signal path and the Q phase signal of the received tag information from a Q signal path.

In operation S320a and S320b, the RFID reader 200 recovers data from the received phase signals. Specifically, the RFID reader 200 decodes the I phase signal and the Q phase signal with respect to each of the I signal path and the Q signal path, and recovers a symbol.

In operation S330a and S330b, the RFID reader 200 checks an integrity of the recovered phase signal. Specifically, the RFID reader 200 detects a preamble signal from the recovered symbol by decoding the I phase signal and the Q phase signal.

In operation S340, the RFID reader 200 selectively selects the integrity-checked phase signal. Specifically, the RFID reader 200 selects the phase signal in which the preamble signal is normally detected.

Thus, according to an exemplary embodiment of the present invention, an RFID reader may accurately select a data-recovered phase signal through an integrity check, and notably reduce a shadow area, even when a backscattered signal of an RFID tag is received via an I signal path or a Q signal path.

Figure 4:
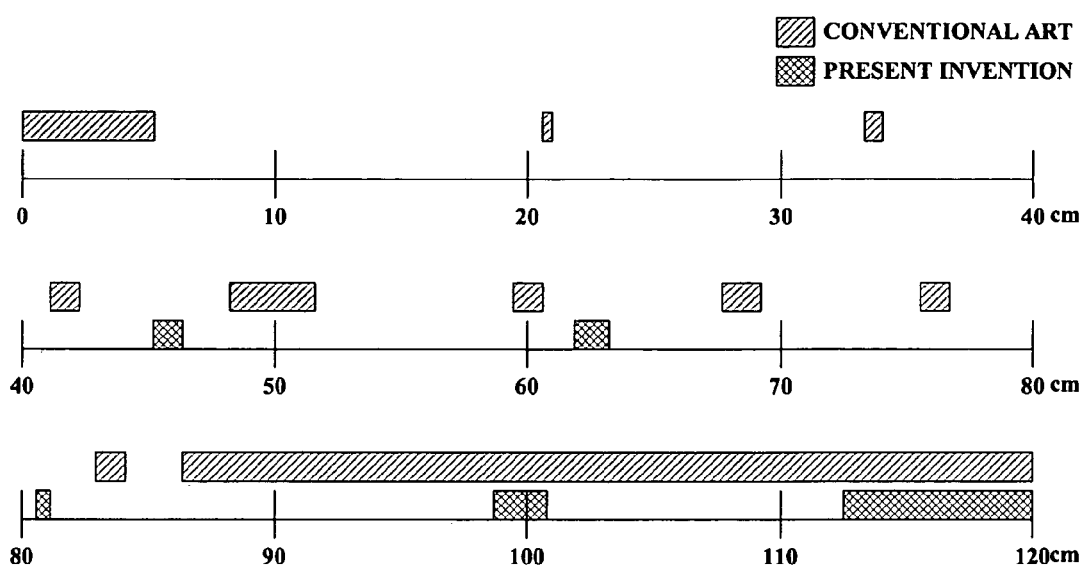
FIG. 4 is a diagram illustrating an example of a reduction of a shadow area of a read range due to an RFID reader according to an exemplary embodiment of the present invention, in comparison with a conventional art.

FIG. 4 is a diagram illustrating an example of a reduction of a shadow area of a read range due to an RFID reader according to an exemplary embodiment of the present invention, in comparison with a conventional art.

According to the conventional art, a phase signal is selected from an I phase signal and a Q phase signal, based on a relative size of the I phase signal and the Q phase signal. As shown in FIG. 4, many shadow areas with respect to the read range exist according to the conventional art. Particularly, the shadow area continually exists from after the read range of '80 cm', as shown in FIG. 4. Accordingly, although an object enters into a cell 120, the RFID reader 100 may not receive tag information from an RFID tag 110.

According to an exemplary embodiment of the present invention, only the integrity-checked phase signal is selectively selected. As shown in FIG. 4, the shadow area is notably reduced compared with the conventional art. Particularly, the shadow area which continually exists appears only after the read range of 110 cm' in FIG. 4. Accordingly, a longer read range is available according to an exemplary embodiment of the present invention.

Thus, according to an exemplary embodiment of the present invention, the shadow area of the read range may be notably reduced, and the RFID reader 100 which can reduce the shadow area of the read range may be embodied.

Figure 5:
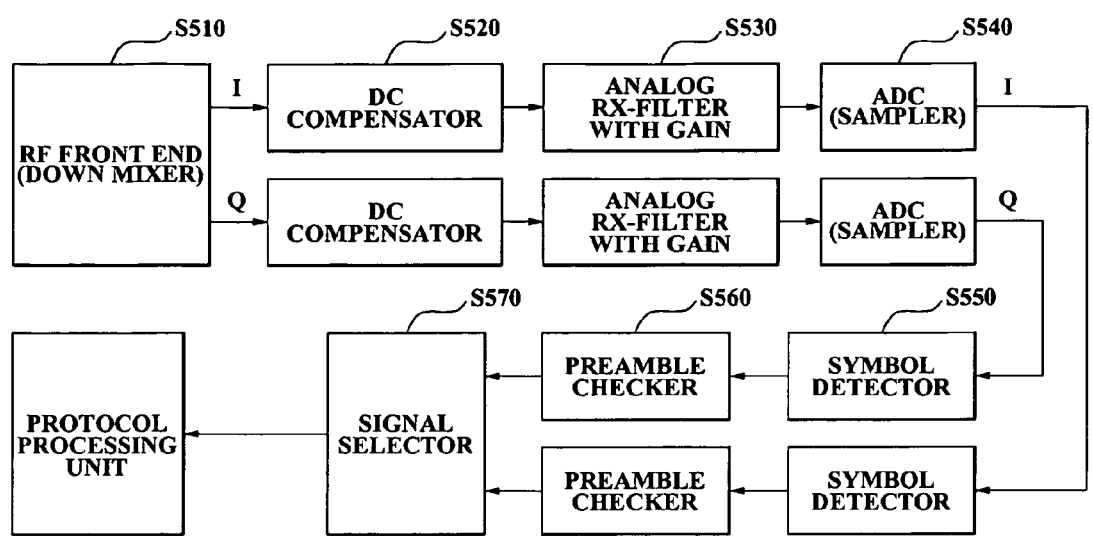
FIG. 5 illustrates a data recovery method according to an exemplary embodiment of the present invention.

Hereinafter, an operation flow of the RFID reader will be described in detail according to an exemplary embodiment of the present invention FIG. 5 is a flowchart illustrating a data recovery method according to an exemplary embodiment of the present invention.

The data recovery method according to an exemplary embodiment of the present invention is performed by an RFID reader 200.

In operation S510, the RFID reader 200 receives tag information from an RFID tag 110. Also, in operation S510, the RFID reader 200 removes a carrier frequency of the received tag information in a down mixer, and generates a baseband. Specifically, an I phase signal and a Q phase signal are generated by the down mixer, from the tag information.

In operation S520, the RFID reader 200 removes a DC component of the generated I phase signal and the Q phase signal. Specifically, for example, the DC component of each of the I phase signal and the Q phase signal is compensated by using a DC compensator such as a high pass filter (HPF).

In operation S530, the RFID reader 200 derives a major component of a signal and amplifies the derived major component. In this instance, the major component includes practical information. Specifically, each of the DC component-compensated I phase signal and the DC component-compensated Q phase signal is amplified by using an analog Rx-filter with gain.

In operation S540, the RFID reader 200 converts the amplified major component from an analog signal to a digital signal. Specifically, the I phase signal and the Q phase signal are digitized by using an ADC sampler. The digitized I phase signal and the digitized Q phase signal are transmitted to a symbol detector which connects to a back end via a multi path.

In operation S550, the RFID reader 200 recovers data with respect to each of the received I phase signal and the received Q phase signal. Specifically, the RFID reader 200 tracks the symbol from the received I phase signal and the received Q phase signal in the symbol detector, and recovers the tracked symbol by using a pattern matching method.

In operation S560, the RFID reader 200 checks an integrity with respect to the recovered data. Specifically, a preamble signal is detected from the recovered symbol.

In operation S570, the RFID reader 200 selects a phase signal which satisfies a predetermined standard. Specifically, an integrity-checked phase signal is selected. Also, a preamble signal-detected I phase signal or a preamble signal-detected Q phase signal is selected.

Finally, the RFID reader 200 transfers the only phase signal which is completely recovered, to a protocol processing unit in the back end, and processes a predetermined protocol.

The above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the present invention, an RFID reader and data recovery method may selectively select a data-recovered and an integrity-checked phase signal of each of an I signal path and a Q signal path, and reduce a shadow area of a read range through signal processing by using a completely data-recovered signal.

Also, according to the present invention, an RFID reader and data recovery method may accurately select a data-recovered phase signal through an integrity check, and notably reduce a shadow area, even when a backscattered signal of an RFID tag is received via an I signal path or a Q signal path.

Although a few exemplary embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A radio frequency identification (RFID) reader comprising:
    a signal receiver of the RFID reader, which receives a plurality of phase signals;
    a symbol detector which recovers data with respect to each of the received phase signals; and
    a signal selector which selects a signal that satisfies a predetermined standard, from the data-recovered phase signals,
    wherein the predetermined standard is satisfied by the signal selector selecting a phase signal which comprises an integrity-checked preamble signal of each of an I signal path and a Q signal path.

2. The RFID reader of claim 1, wherein the symbol detector tracks a symbol from each of the received phase signals, and recovers the tracked symbol by using a predetermined pattern matching method.

3. The RFID reader of claim 2, further comprising:
    a preamble checker which checks the integrity of the recovered data.

4. The RFID reader of claim 3, wherein the preamble checker detects a preamble signal from the recovered symbol, and checks the integrity.

5. The RFID reader of claim 3, wherein the signal selector selects the integrity-checked phase signal from the plurality of phase signals.

6. The RFID reader of claim 1, wherein each of the received phase signals comprises an I phase signal and a Q phase signal.

7. A data recovery method comprising:
    receiving, at a radio frequency identification (RFID) reader, a plurality of phase signals;
    recovering data with respect to each of the received phase signals; and
    selecting a signal, which satisfies a predetermined standard, from the data-recovered phase signals,
    wherein the predetermined standard is satisfied by selecting a phase signal which comprises an integrity-checked preamble signal of each of an I signal path and a Q signal path.

8. The method of claim 7, wherein the recovering comprises:
    tracking a symbol from the plurality of phase signals; and
    recovering the tracked symbol by using a predetermined pattern matching method.

9. The method of claim 8, further comprising checking the integrity with respect to the recovered data.

10. The method of claim 9, wherein the checking comprises detecting a preamble signal from the recovered symbol.

11. The method of claim 9, wherein the selecting selects the integrity-checked phase signal from the plurality of phase signals.

12. The method of claim 7, wherein each of the phase signals comprises an I phase signal and a Q phase signal.

13. A non-transitory computer-readable recording medium storing a program for implementing a method comprising:
    receiving, at a radio frequency identification (RFID) reader a plurality of phase signals;
    recovering data with respect to each of the received phase signals; and
    selecting a signal which satisfies a predetermined standard, from the data-recovered phase signals,
    wherein the predetermined standard is satisfied by selecting a phase signal which comprises an integrity-checked preamble signal of each of an I signal path and a Q signal path.

* * * * *